G. H. SELLERS.
Manufacture of Bar Links.
No. 42,147.
Patented March 29, 1864.
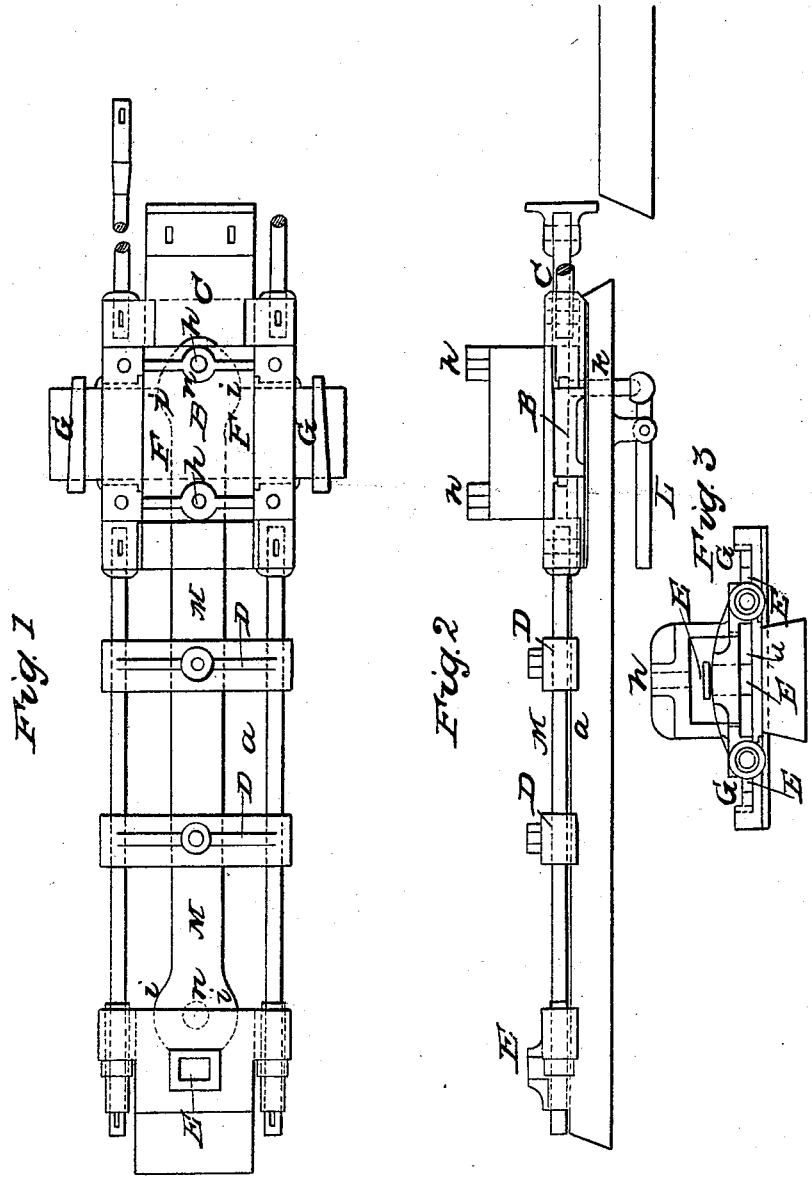
Witnesses
P. E. Wilson
Thomas C. Smith
Inventor
George H. Sellers,
By atty A. B. Stoughton

UNITED STATES PATENT OFFICE.

GEORGE H. SELLERS, OF PHŒNIXVILLE, PENNSYLVANIA, ASSIGNOR TO THE PHŒNIX IRON COMPANY, OF SAME PLACE.

IMPROVEMENT IN THE MANUFACTURE OF BAR-LINKS.

Specification forming part of Letters Patent No. 42,147, dated March 29, 1864.

*To all whom it may concern:*

Be it known that I, GEORGE H. SELLERS, of Phœnixville, in the county of Chester and State of Pennsylvania, have invented certain new and useful Improvements in Making Iron Links, Straps, or Stirrups for Bridges and other Structures; and I do hereby declare the following to be a full, clear and exact description of the same, reference being had to the accompanying drawings, making a part of this specification, in which—

Figure 1 represents a plan of the machine by which I propose to make the links, straps, &c., and showing one of the links in position to be acted upon. Fig. 2 represents a side elevation of the same, and Fig. 3 represents an end view thereof.

Similar letters of reference, where they occur in the separate figures, denote like parts in all cases.

In building bridges of iron or other structures where great tensile strains are encountered it is difficult to unite the bars of iron without destroying or impairing the value or strength of the bar. It is well known and admitted that welding is not reliable, and the present practiced mode of uniting the bars to form links, &c., (where the bar is made of rolled iron,) is from this cause unsafe. If the sectional area of a rolled bar be increased, to compensate for the loss of area at the pin or bolt hole at each end, then another objection arises—viz., the increased weight given the structure, which is termed "dead weight." I overcome these objections and difficulties by my peculiar manner of making a link, &c., from the rolled bar, as will be explained; and my invention consists in forming links, &c., from rolled bars without welding on a piece—viz., by compression or expanding or both, in suitable dies or formers, so that the sectional area of the ends of said bar, through the center of the pin or bolt hole shall equal that of the center of the bar.

To enable others skilled in the art to make and use my invention, I will proceed to describe the same with reference to the drawings.

I take flat rolled bars of the required sectional area, and of such length as is required to make the finished link, and, having heated one end thereof until it arrives at a low welding-heat, I transfer it to the bed-plate $a$, and pass it forward into the box B, and up against the former C. The bar is held firmly in position by the clamps $d\,d$ and stop E. At the same time I bring together the side pieces or formers, $f\,f$, by means of the keys $g\,g$, or otherwise. When thus firmly held, the end former, C, is put in motion by a screw or hydraulic ram, and it forces the hot bar into the shape given by the formers C and $f\,f$, it being kept down to the bed and formers by a plate placed over it, and held by screws passing through the top of the box portion at $h\,h$, or otherwise. When the end of the bar is thus jammed up against the formers and receives the desired form, the movement of the former C is arrested, and the keys $g$ driven back to release the side formers, and the bar is removed, and the pin or bolt-hole may then be made in the enlarged portion, said enlarged portion being such that there will be same area of metal around the hole as in any other part of the bar unoperated upon.

If it is desired to make links from other than flat bars, I proceed as follows: Before putting the bar into the machine I cut a slot in the bar at a point where I intend to make the pin-hole; and when the bar is thus placed in the machine, and the formers C and $f\,f$ are operating upon the bar, I force the punch $k$, Fig. 2, (which may be made slightly tapering,) through the previously-made slot in the bar, by means of the lever L, or otherwise, and thus expand the bar against the formers C and $f\,f$, and thus giving it the required shape. The shape and form of the finished bar or link may be seen at M, Fig. 1, $i\,i$ being the enlarged ends, and $n$ the bolt or pin holes.

I am aware that links have been made by welding on the end pieces to the center bar. I am also aware that iron has been shaped by being upset, welded, or driven into formers. I make no claim to these things; but What I do claim, and desire to secure by Letters Patent is—

The making of links from rolled bars without welding on the enlarged portion—viz., by upsetting the iron at each end of the bar—by and within suitable formers, and so that the sectional area of said ends through the center of the pin-holes shall equal the area of the center of the bar, substantially as and for the purpose described.

GEO. H. SELLERS.

Witnesses:
A. SHAFER,
PAUL S. REEVES.